US011233726B2

(12) United States Patent
Kashyap

(10) Patent No.: US 11,233,726 B2
(45) Date of Patent: Jan. 25, 2022

(54) METHODS, SYSTEMS, AND COMPUTER READABLE MEDIA FOR SUPPORTING MULTI-HOMED CONNECTIONS

(71) Applicant: Oracle International Corporation, Redwood Shores, CA (US)

(72) Inventor: Harish Kumar Kashyap, Morrisville, NC (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 129 days.

(21) Appl. No.: 16/226,589

(22) Filed: Dec. 19, 2018

(65) Prior Publication Data

US 2020/0204478 A1 Jun. 25, 2020

(51) Int. Cl.
*G06F 15/173* (2006.01)
*H04L 12/707* (2013.01)
*H04L 12/725* (2013.01)
*H04L 12/773* (2013.01)
*H04L 29/06* (2006.01)
*H04L 29/12* (2006.01)

(52) U.S. Cl.
CPC ............ *H04L 45/24* (2013.01); *H04L 45/304* (2013.01); *H04L 45/60* (2013.01); *H04L 61/6077* (2013.01); *H04L 63/0236* (2013.01); *H04L 65/608* (2013.01); *H04L 69/14* (2013.01)

(58) Field of Classification Search
CPC ............................ H04L 45/24; H04L 61/6077
See application file for complete search history.

(56) References Cited

U.S. PATENT DOCUMENTS 7,890,637 B1 * 2/2011 Zhang .................. H04L 67/141 709/227

OTHER PUBLICATIONS

Oracle, Oracle Communications Diameter Signaling Router, Release 8.1 Feature Guide, Jul. 2017, all pages. (Year: 2017).*
Oracle, "Oracle Communications Diameter Signaling Router, Release 8.1 Feature Guide", Jul. 2017, all pages.*
"Stream Control Transmission Protocol," Wikipedia, https://en.wikipedia.org/w/index.php?title=Stream_Control_Transmission_Protocol&oldid=872102995, pp. 1-9 (Dec. 2018).
"Netfilter," Wikipedia, https://en.wikipedia.org/w/index.php?title=Netfilter&oldid=872192576, pp. 1-8 (Dec. 2018).
"Oracle Communications Diameter Signaling Router," Release 8.3 Feature Guide, Oracle White Paper, pp. 1-142 (Aug. 2018).
"Oracle Communications Diameter Signaling Router," Release 8.3 Feature Guide, 98 pages (Jul. 2020).

* cited by examiner

*Primary Examiner* — Hua Fan
(74) *Attorney, Agent, or Firm* — Jenkins, Wilson, Taylor & Hunt, P.A.

(57) ABSTRACT

Methods, systems, and computer readable media for supporting multi-homed (MH) connections are disclosed. According to one method, the method comprises: determining that an MH connection is enabled; identifying a local initiate port associated with the MH connection; using the local initiate port to configure connection rules to allow traffic associated with a plurality of paths associated with the MH connection; and using the connection rules to process traffic received over the MH connection.

13 Claims, 8 Drawing Sheets

200

| RULE ID | TUPLE | ACTION |
|---|---|---|
| 1 | LOCAL_IP: IP1, LOCAL_PORT: 4000, REMOTE_PORT: IP3 | ALLOW |
| 2 | LOCAL_IP: IP1, LOCAL_PORT: 4000, REMOTE_PORT: IP4 | ALLOW |
| 3 | LOCAL_IP: IP2, LOCAL_PORT: 4000, REMOTE_PORT: IP3 | ALLOW |
| 4 | LOCAL_IP: IP2, LOCAL_PORT: 4000, REMOTE_PORT: IP4 | ALLOW |

| CONNECTION ID | TUPLE |
|---|---|
| 1 | LOCAL_IP: IP1, LOCAL_PORT: 49222, REMOTE_IP: IP3, REMOTE_PORT: 3868 |
| 2 | LOCAL_IP: IP1, LOCAL_PORT: 49343, REMOTE_IP: IP8, REMOTE_PORT: 3876 |
| 3 | LOCAL_IP: IP2, LOCAL_PORT: 8181, REMOTE_IP: IP9, REMOTE_PORT: 8181 |
| | |

| CONNECTION ID | CONNECTION TYPE | INITIATE PORT | STATUS |
|---|---|---|---|
| 1 | SCTP MH INITIATOR CONNECTION | 49150 | ENABLED |
| 2 | SCTP MH INITIATOR CONNECTION | 49343 | DISABLED |
| | | | |
| | | | |

| RULE ID | TUPLE | ACTION |
|---|---|---|
| 1 | LOCAL_IP: IP1, LOCAL_PORT: 49150, REMOTE_PORT: IP3 | ALLOW |
| 2 | LOCAL_IP: IP1, LOCAL_PORT: 49150, REMOTE_PORT: IP4 | ALLOW |
| 3 | LOCAL_IP: IP2, LOCAL_PORT: 49150, REMOTE_PORT: IP3 | ALLOW |
| 4 | LOCAL_IP: IP2, LOCAL_PORT: 49150, REMOTE_PORT: IP4 | ALLOW |

FIG. 6

METHODS, SYSTEMS, AND COMPUTER READABLE MEDIA FOR SUPPORTING MULTI-HOMED CONNECTIONS

TECHNICAL FIELD

The subject matter described herein relates to network communications. More specifically, the subject matter relates to methods, systems, and computer readable media for supporting multi-homed connections.

BACKGROUND

To improve connectivity in a communications network, network nodes may utilize various protocols, network interfaces, and/or IP addresses to facilitate multiple connections or paths for communications. For example, a stream control transmission protocol (SCTP) may allow network nodes to use a multi-homed (MH) connection, also referred to as a SCTP MH association, where one or more network nodes are reachable via multiple IP addresses and/or ports. While MH connections can be useful, some network components, including firewalls, may not adequately support such features. For example, a firewall or a related system may allow only communications in an MH connection directed to a first IP address of multiple IP addresses associated with a first network node of the MH connection, while blocking communications directed to the other IP addresses associated with the first network node.

SUMMARY

Methods, systems, and computer readable media for supporting multi-homed (MH) connections are disclosed. According to one method, the method comprises: determining that an MH connection is enabled; identifying a local initiate port associated with the MH connection; using the local initiate port to configure connection rules to allow traffic associated with a plurality of paths associated with the MH connection; and using the connection rules to process traffic received over the MH connection.

According to one system, the system includes at least one processor and a connection manager implemented using the at least one processor. The connection manager is configured for: determining that an MH connection is enabled; identifying a local initiate port associated with the MH connection; using the local initiate port to configure connection rules to allow traffic associated with a plurality of paths associated with the MH connection; and using the connection rules to process traffic received over the MH connection.

The subject matter described herein may be implemented in software in combination with hardware and/or firmware. For example, the subject matter described herein may be implemented in software executed by a processor. In some implementations, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to at least one physical computing platform including one or more processors and memory.

As used herein, the terms "function" or "module" refer to hardware, firmware, or software in combination with hardware and/or firmware for implementing features described herein.

BRIEF DESCRIPTION OF THE DRAWINGS

The subject matter described herein will now be explained with reference to the accompanying drawings of which:

FIG. 2 is a diagram illustrating example connection tracking data about connections initiated by a DSR or a message processor (MP);

FIG. 3 is a diagram illustrating example connection rule data related to a multi-homed (MH) connection;

FIG. 5 is a diagram illustrating example connection configuration data associated with a DSR or an MP;

FIG. 6 is a diagram illustrating example connection rule data that supports MH connections;

DETAILED DESCRIPTION

Figure 1:
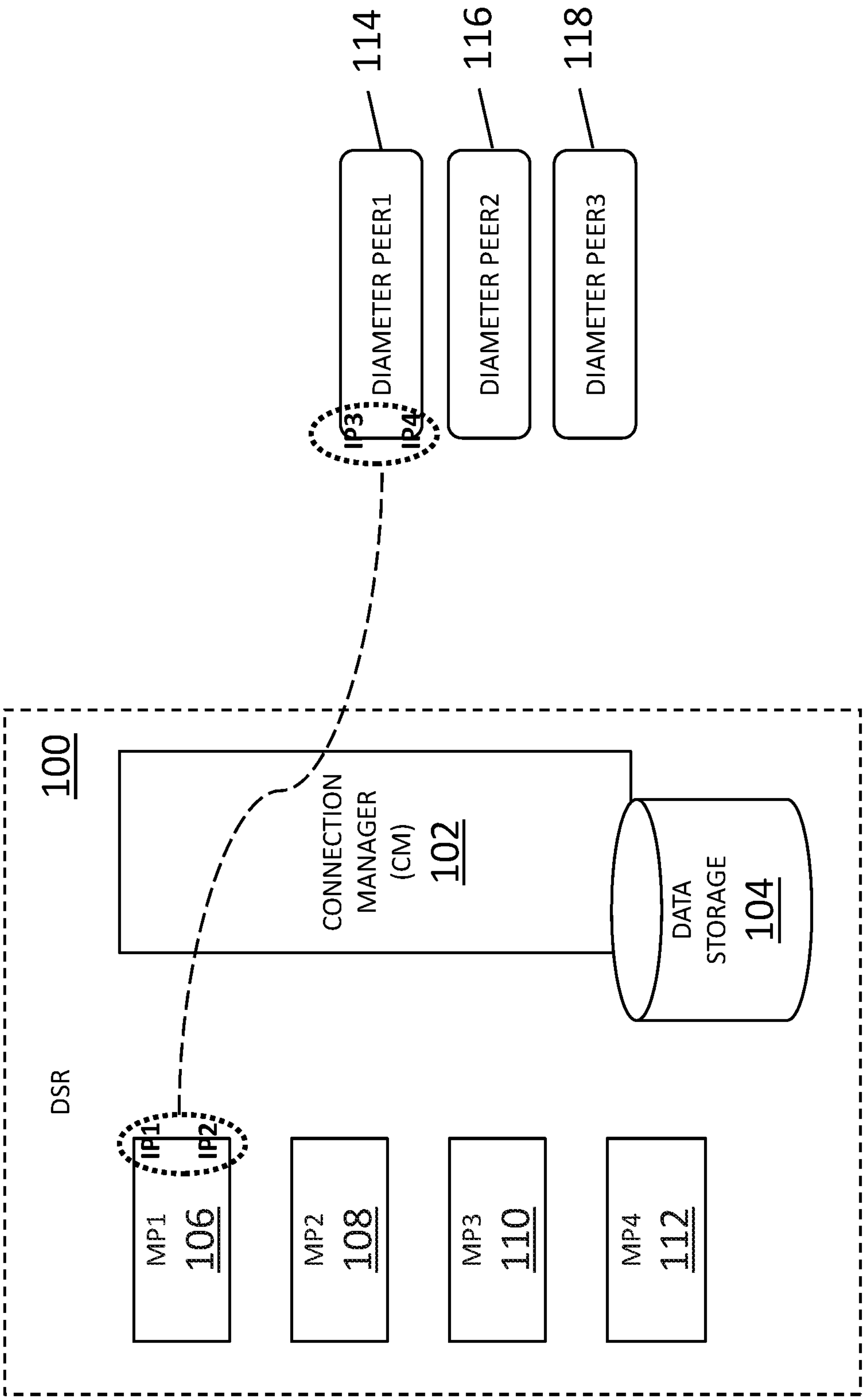
FIG. 1 is a diagram illustrating an example Diameter signaling router (DSR)

The subject matter described herein relates to methods, systems, and computer readable media for supporting multi-homed (MH) connections. Generally, MH connections can allow network nodes to communicate via multiple IP addresses. For example, using an MH connection or association, a Diameter signaling router (DSR) may be reachable via two internet protocol (IP) addresses (e.g., primary IP address=192.157.42.121 and secondary IP address=192.157.42.221) and a Diameter peer may be reachable via two IP addresses (e.g., primary IP address=132.34.53.23 and secondary IP address=132.34.53.67). In this example, there may be four possible traffic paths between the DSR and Diameter peer based on the IP addresses, e.g., 192.157.42.121<->132.34.53.23, 192.157.42.121<->132.34.53.67, 192.157.42.221<->132.34.53.23, and 192.157.42.221<->132.34.53.67. However, issues can occur when traffic is sent over some possible paths because firewall and/or other mechanisms may block such traffic. For example, a DSR implemented using one or more Linux kernel modules may initiate a stream control transmission protocol (SCTP) MH connection using an ephemeral port (e.g., a short-lived port that is determined at the time of use). In this example, a connection tracking module (e.g., a Linux 'nf_conntrack' kernel module) may record connection attributes associated with connections initiated by the DSR in a 'nf_conntrack' table, where one 'nf_conntrack' record may indicate the DSR's primary IP address, the DSR's (ephemeral) port, the Diameter peer's primary IP address, and the Diameter peer's port related to the initiated SCTP MH connection. Continuing with this example, a firewall module (e.g., 'iptables') may generate and/or use firewall rules that allow/restrict traffic based on IP tuples (e.g., datasets indicating local and remote IP addresses and ports of the traffic). However, the firewall rules may be inaccurate in that the rules indicate the various IP addresses associated with the SCTP MH connection but fail to indicate the ephemeral port used by the DSR to initiate the SCTP MH connection (and instead may indicate a local service port). As such, when MH related traffic is directed to the DSR's primary IP address and the ephemeral port, the firewall module may allow the MH related traffic after determining that the connection was initiated by the DSR by inspecting the 'nf_conntrack' table, thereby bypassing the firewall rules. However, when MH related traffic is directed to the DSR's secondary IP address and the ephemeral port, the firewall module may discard this traffic since the firewall rules do not match the traffic (e.g., because of the ephemeral port) and the 'nf_conntrack' table also fails to match the traffic (e.g., since the 'nf_conntrack' table only stores the DSR's primary IP address used to initiate the MH connection and not the DSR's secondary IP address). As such, the firewall module may inadvertently discard valid MH related traffic directed to the DSR's secondary IP address because the traffic appears to be unsolicited in view of the 'nf_conntrack' table and the firewall rules.

In accordance with some aspects of the subject matter described herein, techniques, methods, or mechanisms are disclosed for using non-ephemeral ports to initiate MH connections. For example, instead of using ephemeral ports to initiate an MH connection, a network node or a related entity may select and use a fixed port number for initiating an MH connection. In this example, the initiate port information may be stored in a data store (e.g., a 'Connection-Admin' configuration table) accessible by various other entities, e.g., a firewall module or a connection manager. Continuing with this example, the network node or a related entity may use this initiate port information to configure connection rules (e.g., 'iptables' rules) that allow traffic from any path associated with the MH connection.

In accordance with some aspects of the subject matter described herein, techniques, methods, or mechanisms are disclosed for supporting MH connections initiated by a DSR, a message processor, or a network node. For example, a message processor may initiate an SCTP MH connection that utilizes multiple IP addresses for endpoints. In this example, the message processor may generate, using a known port that initiated the SCTP MH connection, connection rules that allow traffic to any of the IP addresses related to the SCTP MH connection to be received and/or processed by the message processor.

Advantageously, in accordance with some aspects of the subject matter described herein, by using non-ephemeral (e.g., long-lived) initiate ports to initiate MH connection and providing access to information about the initiate ports to one or more entities involved in security or admission control, connection rules can be generated to adequately support MH connections.

Reference will now be made in detail to various embodiments of the subject matter described herein, examples of which are illustrated in the accompanying drawings. Wherever possible, the same reference numbers will be used throughout the drawings to refer to the same or like parts.

FIG. 1 is a diagram illustrating a Diameter signaling router (DSR) 100. DSR 100 may represent any suitable entity for routing or relaying Diameter signaling messages, e.g., between Diameter entities and Diameter servers. For example, DSR 100 may be a long-term evolution (LTE) signaling router, an LTE Diameter signaling router, a Diameter signaling agent, a Diameter proxy agent, a Diameter relay agent, a Diameter routing agent, a Diameter translation agent, or a Diameter redirect agent. DSR 100 may include functionality for processing various messages. DSR 100 may include various communications interfaces for communication with Diameter entities, e.g., 3rd Generation Partnership Project (3GPP) LTE communications interfaces and other (e.g., non-LTE) communications interfaces. In some embodiments, receiving, processing, and/or routing functionality may be included in one or more modules. For example, DSR 100 may include or have access to one or more modules for receiving Diameter signaling messages associated with multiple different Diameter signaling interfaces, e.g., S9, S6a, S11, Cx, and Dx.

In some embodiments, DSR 100 may be located in a single distinct geographic location and communicate via an internal communications network and/or may include components (e.g., message processors (MPs) 106-112) that are located in geographically diverse locations and may communicate via an external communications network. In some embodiments, each of MPs 106-112 may be a distinct message processing module of a distributed computing platform, a computing blade in a blade-based distributed computing platform, a processing core element associated with a single or multi-core computing device, or a virtual node instantiated on a single physical computing device.

In some embodiments, DSR 100 and/or MPs 106-112 may interact with Diameter peers 114-118. Diameter peers 114-118 may include network nodes, such as mobility management entities (MMEs), packet gateway (PGWs), and/or CSCFs, grouped based on common functionality, a common IP address, a common network operator, or a common geographical location. In some embodiments, Diameter peers 114-118 may set up one or more connections by DSR 100 or MPs therein. In some embodiments, DSR 100 or MPs therein may initiate connection with Diameter peers 114-118

DSR 100 may include a connection manager (CM) 102. CM 102 may represent any suitable entity or entities (e.g., software executing on a processor, an application-specific integrated circuit (ASIC), and/or a field-programmable gate array (FPGA)) for performing aspects related to connections setup and management and/or related security. In some embodiments, CM 102 may be configured to perform firewall functionality. For example, DSR 100 may include Linux based software and CM 102 may include or interact with Linux 'iptables' or 'ipsets' modules. In this example, CM 102 or related modules may manage connection rules for determining whether received traffic is to be allowed or discarded. In some embodiments, CM 102 may be separate from or may be integrated with DSR 100 and/or MPs 106-112.

CM 102 may include functionality for controlling traffic admission or related access to one or more MPs 106-112. For example, DSR 100 and/or MPs 106-112 may receive Diameter messages via an LTE interface, an IMS interface, a 3GPP specification interface, etc. In this example, using a set of connection rules and header information from the messages, CM 102 may determine whether the received messages are allowed to be processed and/or received by MPs 106-112.

In some embodiments, DSR 100, CM 102, and/or MPs 106-112 may support MH connections, e.g., where communications in a session or established MH association can reach an endpoint via one or more IP addresses associated with that endpoint. For example, instead of using ephemeral ports for initiating connections, DSR 100, CM 102, and/or MPs 106-112 may be configured to utilize a specified port number as a local initiate port when initiating an SCTP MH connection. In this example, DSR 100, CM 102, and/or MPs 106-112 may also use this port number to configure connection rules (e.g., firewall rules) for allowing traffic via valid paths associated with the SCTP MH connection.

In some embodiments, supporting MH connections includes storing information about a non-ephemeral port used as a local initiate port when initiating an SCTP MH connection such that the port information can be used to generate a plurality of connection rules. In such embodiments, the connection rules may indicate various IP tuples and/or paths associated with the SCTP MH connection.

In some embodiments, connection rules for supporting MH connections may be generated or accessed by DSR 100, CM 102, and/or MPs 106-112. In some embodiments, connection rules may be stored in data storage 104.

Data storage 104 may represent any suitable entity (e.g., a non-transitory computer readable medium, embedded memory, or a memory device) for storing data associated with supporting MH connections. Data storage 104 may store initiated connection data including non-ephemeral initiate port data, connection rules, and related connection configuration information, e.g., non-ephemeral ports usable for initiating MH connections. In some embodiments, data storage 104 may be accessible by CM 102 and other entities and may be usable for various purposes associated with load distribution. In some embodiments, data storage 104 may be located on a single device or computing platform or may be distributed across multiple devices or computing platforms.

It will be appreciated that FIG. 1 is for illustrative purposes and that various nodes, their locations, and/or their functions (e.g., modules) described above in relation to FIG. 1 may be changed, altered, added, or removed. For example, some nodes and/or functions may be combined into a single entity. In another example, some nodes and/or functions may be distributed across multiple nodes and/or platforms.

FIG. 2 is a diagram illustrating example connection rule data 200 related to an MH connection. Connection rule data 200 may represent firewall rules and/or other information associated with allowing or disallowing connections or communications. In some embodiments, CM 102 may generate connection rule data 200 using Linux 'iptables' or 'ipsets' modules or related functionality. For example, connection rule data 200 (e.g., 'iptables' or 'ipsets' data) may be defined as follows (assuming local IP addresses=192.168.4.130, 192.168.4.131, local listening port=4000, remote IP addresses=192.168.4.111, 192.168.4.211):

```
Name: dsrIPv4conns
Type: hash:ip,port,ip
Header: family inet hashsize 1024 maxelem 65536
Size in memory: 17408
References: 1
Members:
  192.168.4.130,sctp:4000,192.168.4.111
  192.168.4.131,sctp:4000,192.168.4.111
  192.168.4.130,sctp:4000,192.168.4.211
  192.168.4.131,sctp:4000,192.168.4.211
```

In some embodiments, connection rule data 200 may not adequately support SCTP MH initiator connections. For example, connection rule data 200 may refer to traffic matching one of the IP tuples and a local listening port, e.g., port number 4000. For example, in FIG. 6, each of the depicted IP tuples refer to a port 4000 and one IP address for each endpoint of an SCTP MH initiator connection. In this example, the IP tuples refer to four different possible paths between the endpoints of the SCTP MH initiator connection, e.g., IP1<->IP3, IP1<->IP4, IP2<->IP3, and IP2<->IP4. However, since traffic associated with an SCTP MH initiator connection may be sent to an ephemeral port (that is not the same as the local listening port), the connection rules may not match one or more IP tuples associated with the SCTP MH initiator connection and, as such, connection rule data 200 may fail to adequately support allowing traffic from all of the valid paths associated with the SCTP MH initiator connection.

In some embodiments, connection rule data 200 may be accessed and/or stored by DSR 100, CM 102, and/or MPs 106-112. In some embodiments, connection rule data 200 may be stored in data storage 104 using various data structures. For example, connection rule data 200 may include associations between rules identifiers, IP tuples (e.g., data sets involving IP header values), and actions (e.g., allow or discard).

Referring to FIG. 2, a table representing connection rule data 200 comprising columns and/or fields for rule identifier, IP tuples, and rule actions to perform is depicted. A rule identifier field may represent a value, name, or number for indicating a connection rule, e.g., a firewall rule. For example, as shown in FIG. 2, each firewall rule enforced by CM 102 may be associated with a unique number.

An IP tuple field may represent message header values or related packet header data for indicating traffic (e.g., messages and/or packets) associated with a connection rule. For example, each connection rule may be enforced for a particular group of messages as determined by a matching IP tuple. As shown in FIG. 2, each IP tuple indicates the local initiate port number (e.g., 49150), one of a plurality of IP addresses (IP1, IP2) associated with a local endpoint, and one of a plurality of IP addresses (IP3, IP4) associated with a remote endpoint of an SCTP MH initiator connection.

An action field may represent one or more values or related identifiers for indicating one or more actions associated with a connection rule. For example, an action field may indicate what action CM 102 (e.g., a firewall) is to perform if the connection rule is triggered (e.g., if a message matches the IP tuple associated with the connection rule). As shown in FIG. 2, each rule indicates that matching traffic is to be allowed.

It will also be appreciated that connection rule data 200 is for illustrative purposes and that different and/or additional data than the data depicted in FIG. 2 may be usable for indicating connection rules or related information. Further, connection rule data 200 may be stored or managed using various data structures and/or computer readable media.

FIG. 3 is a diagram illustrating example connection tracking data 300 about connections initiated by DSR 100 or an MP (e.g., MP 106). In some embodiments, connection tracking data 300 may include records or related data associated with a Linux 'nf_conntrack' kernel module. For example, a Linux 'nf_conntrack' record may be represented as follows: ipv4 2 sctp 132 431999 ESTABLISHED src=192.168.4.111 dst=192.168.4.130 sport=49151 dport=4000 src=192.168.4.130 dst=192.168.4.111 sport=4000.

In some embodiments, connection tracking data 300 may be accessed and/or stored by DSR 100, CM 102, and/or MPs 106-112. In some embodiments, connection tracking data 300 may be stored in data storage 104 using various data structures. For example, connection tracking data 300 may include associations between connection identifiers and IP tuples (e.g., data sets involving IP header values).

Referring to FIG. 3, a table representing connection tracking data 300 comprising columns and/or fields for connection identifiers and IP tuples is depicted. A connection identifier field may represent a value, name, or number for indicating a connection. For example, as shown in FIG. 3, each connection initiated by DSR 100 or an MP therein may be associated with a unique number.

An IP tuple field may represent one or more message header values or related packet header data for identifying an initiated connection. For example, each connection may be identified by an IP tuple. As shown in FIG. 3, each IP tuple indicates a local or source port number (e.g., 49222), a local or source IP address (e.g., IP1), a remote or destination port number (e.g., 3868), and a remote or destination IP address (e.g., IP3).

It will also be appreciated that connection tracking data 300 is for illustrative purposes and that different and/or additional data than the data depicted in FIG. 3 may be usable for indicating connections initiated by a network node (e.g., DSR 100 or an MP therein). Further, connection tracking data 300 may be stored or managed using various data structures and/or computer readable media.

Figure 4:
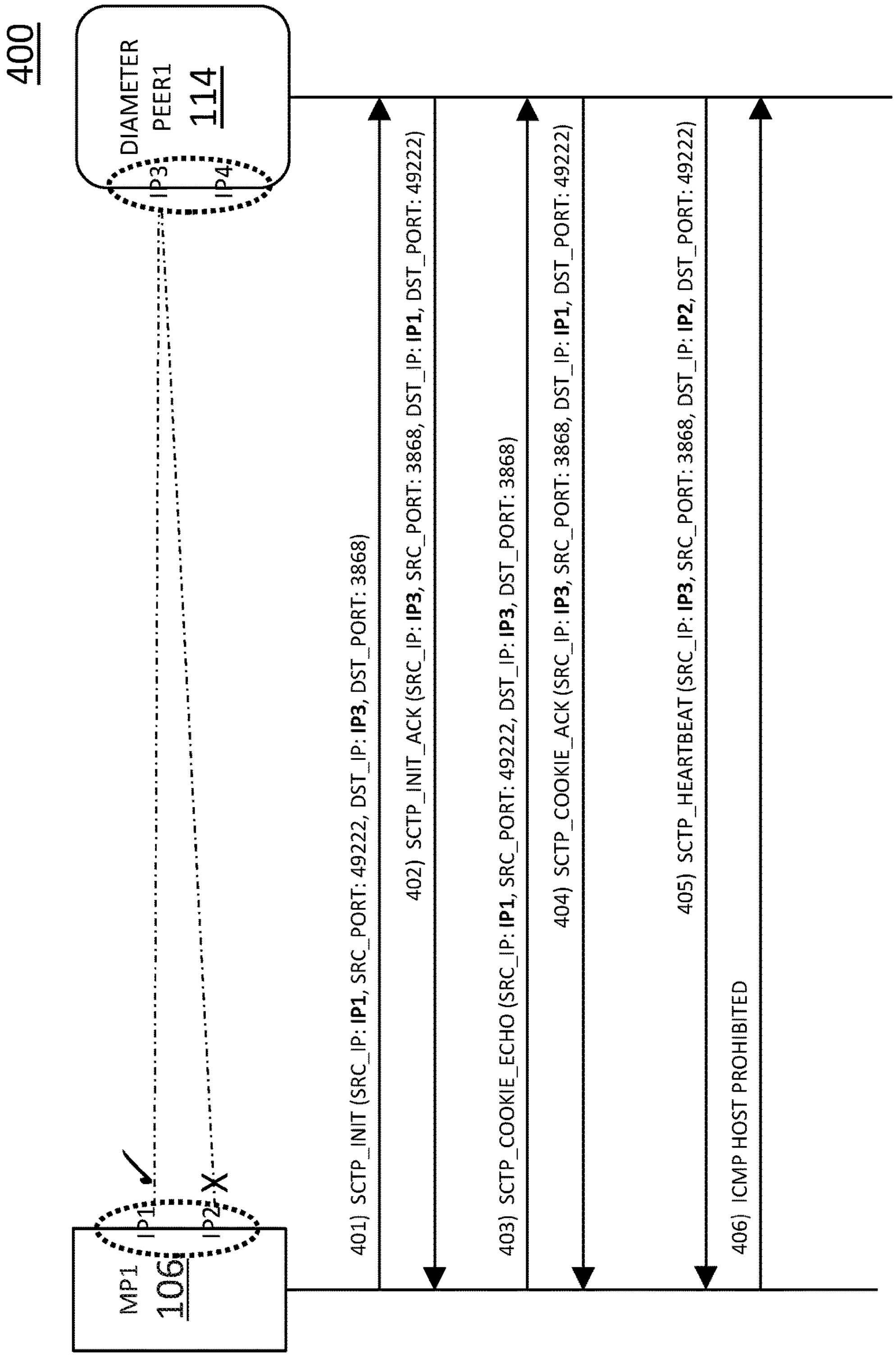
FIG. 4 is a diagram illustrating example messages between a Diameter peer and an MP.

FIG. 4 is a diagram illustrating example messages between a Diameter peer 114 and MP 106. In some embodiments, DSR 100, CM 102, and/or MP 106 may be configured for allowing traffic to a primary IP address associated with MP 106. For example, where DSR 100 is implemented using Linux, MP 106 or a related CM 102 (e.g., a signaling firewall) may be configured to use an ephemeral port (e.g., a port number that may be short-lived and/or unknown to other modules or components of MP 106) when initiating an MH connection. In this example, MP 106 or CM 102 may configure connection rules (see FIG. 2) using a local service port number (but not the ephemeral port used when initiating the MH connection). Continuing with this example, MP 106 or CM 102 may store an IP address and a port number used for initiating an MH connection in a connection tracking data store, e.g., a Linux 'nf_conntrack' table (see FIG. 3), where MP 106 or CM 102 may be configured to allow traffic directed to the IP address and port number stored in the connection tracking data store, but may block or discard traffic directed to another IP address and/or port number associated with MP 106 since the connection rules do not refer to the ephemeral port used by the received traffic and used when initiating the MH connection.

Referring to FIG. 4, in step 401, an SCTP initiate message may be sent from MP 106 to Diameter peer 114. In some embodiments, the SCTP initiate message may include a list of addresses (e.g., IP1, IP2) for communicating with MP 106 as a payload. In some embodiments, the SCTP initiate acknowledgement message may include header information indicating a source IP (IP1) and a source port (a non-ephemeral port 49150) and indicating a destination IP (IP3) and a destination port (3868).

In step 402, an SCTP initiate acknowledgement message may be sent from Diameter peer 114 to MP 106. In some embodiments, the SCTP initiate acknowledgement message may include a list of addresses (e.g., IP3, IP4) for communicating with Diameter peer 114 as a payload. In some embodiments, the SCTP initiate acknowledgement message may include header information indicating a source IP (IP3) and a source port (3868) and indicating a destination IP (IP1) and a destination port (49150).

In some embodiments, an SCTP initiate acknowledgement message may include a cookie parameter from Diameter peer 114. In some embodiments, the cookie parameter may include transmission control block (TCB) information, a valid lifetime value, and a signature for authentication. In some embodiments, the cookie parameter may be a security measure since an SCTP initiate acknowledgement is sent to the source address of the SCTP initiate message.

In step 403, an SCTP cookie echo message may be sent from MP 106 to Diameter peer 114. In some embodiments, the SCTP cookie echo message may include the cookie parameter and/or other information received from Diameter peer 114, where Diameter peer 114 can validate the cookie parameter and use it to rebuild the TCB information. In some embodiments, the SCTP cookie echo message may include header information indicating a source IP (IP1) and a source port (49150) and indicating a destination IP (IP3) and a destination port (3868).

In step 404, an SCTP cookie echo acknowledgement message may be sent from Diameter peer 114 to MP 106. In some embodiments, the SCTP cookie echo acknowledgement message may indicate that the cookie parameter was validated. In some embodiments, the SCTP cookie echo acknowledgement message may include header information indicating a source IP (IP3) and a source port (3868) and indicating a destination IP (IP1) and a destination port (49150).

In some embodiments, one endpoint associated with an SCTP MH connection may send heartbeat messages to various IP addresses associated with the other endpoint of the SCTP MH connection. In such embodiments, the heartbeat messages may be used to determine the health (e.g., availability) of an IP address or related path. For example, for a given SCTP MH connection, an endpoint may be configured to send periodic heartbeat messages to each IP address associated with another endpoint. In this example, if a heartbeat message sent to a particular IP address does not yield a timely response or if a particular percentage of heartbeat messages sent to the particular IP address fails to yield a timely response, then the endpoint may determine that the path is unavailable and may stop sending traffic to that IP address (at least temporarily).

In step 405, an SCTP heartbeat message may be sent from Diameter peer 114 to MP 106 via an alternate IP address (e.g., different from the IP address used in initiating the MH connection) associated with MP 106. In some embodiments, the SCTP heartbeat message may be for indicating path or connection availability associated with MP 106. In some embodiments, the SCTP heartbeat message may include header information indicating a source IP (IP3) and a source port (3868) and indicating a destination IP (IP2) and a destination port (49150).

In some embodiments, MP 106 or CM 102 may query a data store containing various connection rules to determine whether an SCTP heartbeat message should be processed or discarded. For example, where DSR 100 is implemented using Linux, CM 102 may attempt to identify a connection rule (e.g., a firewall rule) in a rules table based on an IP tuple (e.g., local IP: IP2, local port: 49150, remote_IP: IP3) related to the heartbeat message. In this example, if the IP tuple fails to match an "allow" connection rule since the IP tuples associated with the connection rules refer to the local service port (and not the ephemeral port used in initiating the MH connection). As such, CM 102 may send a reject message (e.g., an internet control message protocol (ICMP) host prohibited message) indicating that the heartbeat message is to be discarded or not allowed.

In step 406, an ICMP host prohibited message may be sent from MP 106 to Diameter peer 114. In some embodiments, the ICMP host prohibited message may indicate that a heartbeat message has been rejected or discarded by MP 106 or a related system.

It will be appreciated that FIG. 4 is for illustrative purposes and that additional and/or different steps than those depicted in FIG. 4 can be usable for performing metadata-driven data collection. Additionally, it will be appreciated that steps depicted in FIG. 4 can occur in a different order than depicted or can be combined with other steps.

FIG. 5 is a diagram illustrating example connection configuration data 500 associated with DSR 100 or an MP (e.g., MP 106). Connection configuration data 500 may represent information for configuring a connection or performing related functions, e.g., supporting an MH connection. In some embodiments, CM 102 may generate connection configuration data 500 using a Linux ‘ConnectionAdmin’ kernel module or related functionality. For example, connection configuration data 500 may include a Linux ‘ConnectionAdmin’ record indicating port information (e.g., a fixed or long-lived port number) usable for initiating one or more SCTP MH connections by MP 106.

In some embodiments, connection configuration data 500 may be accessed and/or stored by DSR 100, CM 102, and/or MPs 106-112. In some embodiments, connection configuration data 500 may be stored in data storage 104 using various data structures. For example, connection configuration data 500 may include associations between connection identifiers, connection types, initiate ports, and port statuses (e.g., enabled or disabled).

Referring to FIG. 5, a table representing connection configuration data 500 comprising columns and/or fields for connection identifiers, connection types, initiate ports, and port statuses is depicted. A connection identifier field may represent a value, name, or number for indicating a connection. For example, as shown in FIG. 5, each SCTP MH connection used by DSR 100 or MP 106 may be associated with a unique number.

A connection type field may represent one or more values or related identifiers for indicating a type of connection. For example, each connection type may indicate protocol information or connection attributes. As shown in FIG. 5, each connection type may be an SCTP MH initiator connection.

An initiate port field may represent one or more values or related identifiers for indicating a port for initiating an MH connection. For example, each initiate port may indicate a port number used as a local initiate port. As shown in FIG. 5, each initiate port may indicate a non-ephemeral port number usable for the life of an SCTP MH initiator connection.

A port status field may represent a value for indicating a status of a port used for initiating an MH connection. For example, as shown in FIG. 5, each port status may indicate that a related port is enabled or disabled.

It will also be appreciated that connection configuration data 500 is for illustrative purposes and that different and/or additional data than the data depicted in FIG. 5 may be usable for configuring connections or related ports initiated by a network node (e.g., DSR 100 or an MP therein). Further, connection configuration data 500 may be stored or managed using various data structures and/or computer readable media.

FIG. 6 is a diagram illustrating example connection rule data 600 for supporting MH connections. Connection rule data 600 may represent firewall rules and/or other information associated with allowing or disallowing connections or communications. In some embodiments, CM 102 may generate connection rule data 600 using Linux ‘iptables’ or ‘ipsets’ modules or related functionality. For example, connection rule data 600 (e.g., ‘iptables’ or ‘ipsets’ data) may be defined as follows (assuming local IP addresses=192.168.4.130, 192.168.4.131, local listening port=49150, remote IP addresses=192.168.4.111, 192.168.4.211):

```
Name: dsrIPv4conns
Type: hash:ip,port,ip
Header: family inet hashsize 1024 maxelem 65536
Size in memory: 17408
References: 1
Members:
  192.168.4.130,sctp:49150,192.168.4.111
  192.168.4.131,sctp:49150,192.168.4.111
  192.168.4.130,sctp:49150,192.168.4.211
  192.168.4.131,sctp:49150,192.168.4.211
```

In some embodiments, connection rule data 600 may support SCTP MH initiator connections, e.g., by allowing traffic that matches any valid IP tuple associated with the SCTP MH initiator connection to be processed by MPs 106-112. For example, DSR 100, CM 102, and/or a related entity (e.g., a related Linux kernel) may use a fixed or specified port number as a local initiate port number when initiating an SCTP MH connection. In this example, DSR 100, CM 102, and/or a related entity may use this port number to configure connection rules (e.g., iptables/ipsets data) to allow traffic via valid SCTP MH channels or paths. For example, in FIG. 6, each of the depicted IP tuples refer to an initiate port 49150 and one IP address for each endpoint of an SCTP MH initiator connection. In this example, the IP tuples refer to four different possible paths between the endpoints of the SCTP MH initiator connection, e.g., IP1<->IP3, IP1<->IP4, IP2<->IP3, and IP2<->IP4.

In some embodiments, connection rule data 600 may be accessed and/or stored by DSR 100, CM 102, and/or MPs 106-112. In some embodiments, connection rule data 600 may be stored in data storage 104 using various data structures. For example, connection rule data 600 may include associations between rules identifiers, IP tuples (e.g., data sets involving IP header values), and actions (e.g., allow or discard).

Referring to FIG. 6, a table representing connection rule data 600 comprising columns and/or fields for rule identifiers, IP tuples, and rule actions to perform is depicted. A rule identifier field may represent a value, name, or number for indicating a connection rule, e.g., a firewall rule. For example, as shown in FIG. 6, each firewall rule enforced by CM 102 may be associated with a unique number.

An IP tuple field may represent message header values or related packet header data for indicating traffic (e.g., messages and/or packets) associated with a connection rule. For example, each connection rule may be enforced for a particular group of messages as determined by a matching IP tuple. As shown in FIG. 6, each IP tuple indicates the local initiate port number (e.g., 49150), one of a plurality of IP addresses (IP1, IP2) associated with a local endpoint, and one of a plurality of IP addresses (IP3, IP4) associated with a remote endpoint of an SCTP MH initiator connection.

An action field may represent one or more values or related identifiers for indicating one or more actions associated with a connection rule. For example, an action field may indicate what action CM 102 (e.g., a firewall) is to perform if the connection rule is triggered (e.g., if a message matches the related IP tuple). As shown in FIG. 6, each rule indicates that matching traffic is to be allowed.

It will also be appreciated that connection rule data 600 is for illustrative purposes and that different and/or additional data than the data depicted in FIG. 6 may be usable for indicating firewall rules or related information. Further, connection rule data 600 may be stored or managed using various data structures and/or computer readable media.

Figure 7:
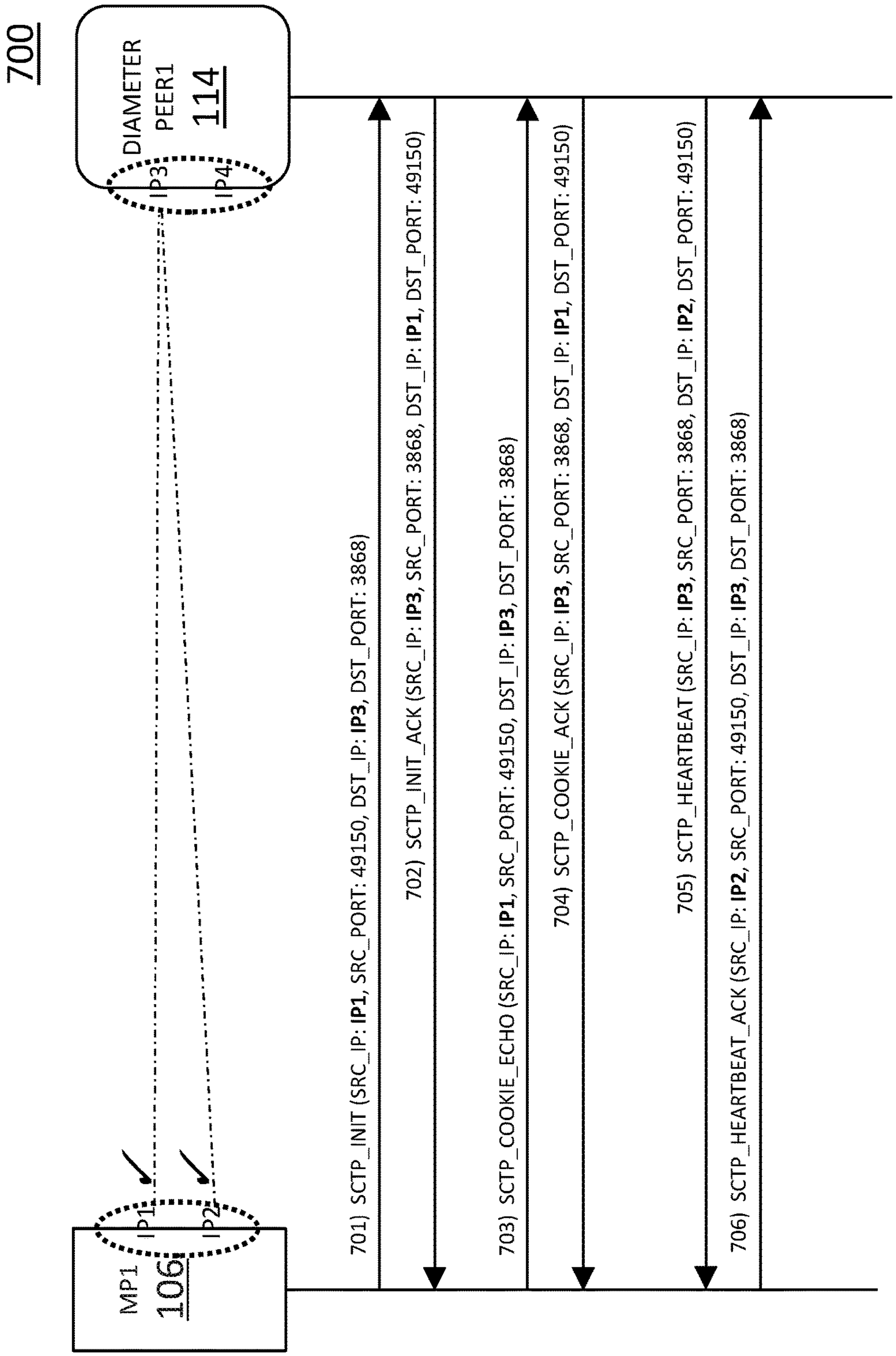
FIG. 7 is a diagram illustrating example messages between a Diameter peer and an MP that supports MH connections.

FIG. 7 is a diagram illustrating example messages between a Diameter peer 114 and MP 106 that supports MH connections. In some embodiments, MP 106 may be configured for supporting MH connections. For example, where DSR 100 is implemented using Linux, MP 106 or a related CM 102 (e.g., a signaling firewall) may be configured to use non-ephemeral ports when initiating an MH connection. In this example, when a connection is enabled, a port number associated with the connection is stored in a data entry of a connection configuration data store, e.g., 'ConnectionAdmin' data (see FIG. 5). Continuing with this example, MP 106 or CM 102 may monitor the connection configuration data store to detect when a connection is enabled and may configure connection rules (see FIG. 6) using the non-ephemeral (e.g., assigned) port number associated with enabled connection such that MP 106 can receive traffic along any valid path associated with the MH connection.

Referring to FIG. 7, in step 701, an SCTP initiate message may be sent from MP 106 to Diameter peer 114. In some embodiments, the SCTP initiate message may include a list of addresses (e.g., IP1, IP2) for communicating with MP 106 as a payload. In some embodiments, the SCTP initiate acknowledgement message may include header information indicating a source IP (IP1) and a source port (a non-ephemeral port 49150) and indicating a destination IP (IP3) and a destination port (3868).

In step 702, an SCTP initiate acknowledgement message may be sent from Diameter peer 114 to MP 106. In some embodiments, the SCTP initiate acknowledgement message may include a list of addresses (e.g., IP3, IP4) for communicating with Diameter peer 114 as a payload. In some embodiments, the SCTP initiate acknowledgement message may include header information indicating a source IP (IP3) and a source port (3868) and indicating a destination IP (IP1) and a destination port (49150).

In some embodiments, an SCTP initiate acknowledgement message may include a cookie parameter from Diameter peer 114. In some embodiments, the cookie parameter may include TCB information, a valid lifetime value, and a signature for authentication. In some embodiments, the cookie parameter may be a security measure since an SCTP initiate acknowledgement is sent to the source address of the SCTP initiate message.

In step 703, an SCTP cookie echo message may be sent from MP 106 to Diameter peer 114. In some embodiments, the SCTP cookie echo message may include the cookie parameter and/or other information received from Diameter peer 114, where Diameter peer 114 can validate the cookie parameter and use it to rebuild the TCB information. In some embodiments, the SCTP cookie echo message may include header information indicating a source IP (IP1) and a source port (49150) and indicating a destination IP (IP3) and a destination port (3868).

In step 704, an SCTP cookie echo acknowledgement message may be sent from Diameter peer 114 to MP 106. In some embodiments, the SCTP cookie echo acknowledgement message may indicate that the cookie parameter was validated. In some embodiments, the SCTP cookie echo acknowledgement message may include header information indicating a source IP (IP3) and a source port (3868) and indicating a destination IP (IP1) and a destination port (49150).

In some embodiments, one endpoint associated with an SCTP MH connection may send heartbeat messages to various IP addresses associated with the other endpoint of the SCTP MH connection. In such embodiments, the heartbeat messages may be used to determine the health (e.g., availability) of an IP address or related path. For example, for a given SCTP MH connection, an endpoint may be configured to send periodic heartbeat messages to each IP address associated with another endpoint. In this example, if a heartbeat message sent to a particular IP address does not yield a timely response or if a particular percentage of heartbeat messages sent to the particular IP address fails to yield a timely response, then the endpoint may determine that the path is unavailable and may stop sending traffic to that IP address (at least temporarily).

In step 705, an SCTP heartbeat message may be sent from Diameter peer 114 to MP 106 via an alternate IP address (e.g., different from the IP address used in initiating the MH connection) associated with MP 106. In some embodiments, the SCTP heartbeat message may be for indicating path or connection availability associated with MP 106. In some embodiments, the SCTP heartbeat message may include header information indicating a source IP (IP3) and a source port (3868) and indicating a destination IP (IP2) and a destination port (49150).

In some embodiments, MP 106 or CM 102 may query a data store containing various connection rules to determine whether an SCTP heartbeat message should be processed or discarded. For example, where DSR 100 is implemented using Linux, CM 102 may identify or match a connection rule (e.g., a firewall rule) in a 'ipsets' or 'iptables' rules table based on an IP tuple (e.g., local IP: IP2, local port: 49150, remote_IP: IP3) related to the heartbeat message since the IP tuples associated with the connection rules refer to the non-ephemeral port used in initiating the MH connection. In this example, the connection rule may indicate that the heartbeat message is allowed for processing.

In step 706, an SCTP heartbeat acknowledgement message may be sent from MP 106 to Diameter peer 114. In some embodiments, the SCTP heartbeat acknowledgement message may indicate that a path or connection associated with MP 106 is available or active. In some embodiments, the SCTP heartbeat acknowledgement message may include header information indicating a source IP (IP2) and a source port (49150) and indicating a destination IP (IP3) and a destination port (3868).

It will be appreciated that FIG. 7 is for illustrative purposes and that additional and/or different steps than those depicted in FIG. 7 can be usable for performing metadata-driven data collection. Additionally, it will be appreciated that steps depicted in FIG. 7 can occur in a different order than depicted or can be combined with other steps.

Figure 8:
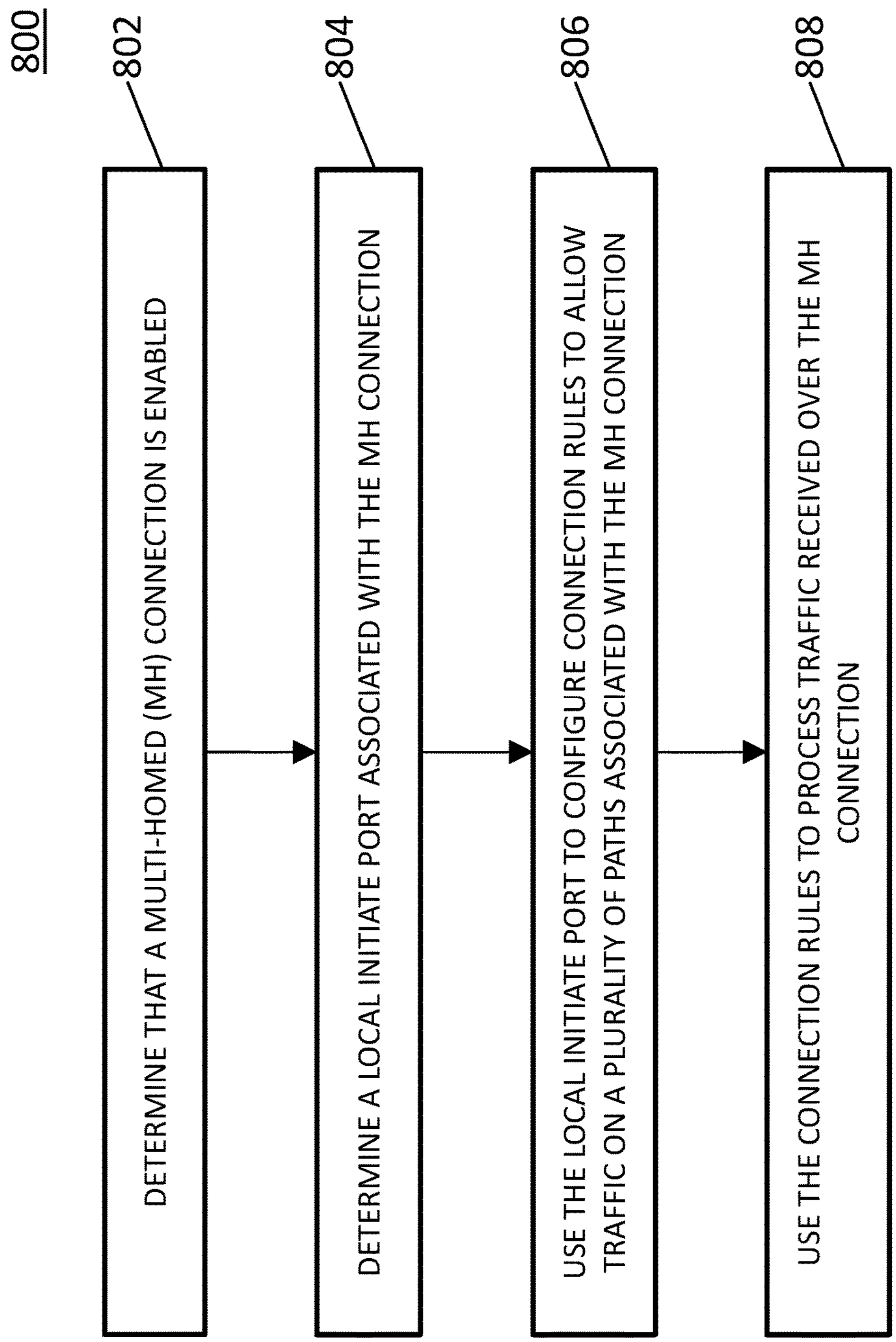
FIG. 8 is a diagram illustrating an example process for supporting MH connections.

FIG. 8 is a diagram illustrating an example process 800 for supporting MH connections. In some embodiments, process 800, or portions thereof (e.g., steps 802, 804, 806, and/or 808), may be performed by or at DSR 100, CM 102, MPs 106-112, and/or another node or module.

Referring to process 800, in step 802, it may be determined that an MH connection is enabled. In some embodiments, an MH connection may be an SCTP MH connection or association. For example, an MH connection may be an SCTP MH initiator connection.

In step 804, a local initiate port associated with the MH connection may be identified. In some embodiments, a local initiate port may be a non-ephemeral port determined prior to the MH connection being initiated, e.g., by MP 106.

In step 806, the local initiate port may be used to configure connection rules to allow traffic associated with a plurality of paths associated with the MH connection. In some embodiments, connection rules may indicate that traffic directed to one of a plurality of IP addresses associated with the MH connection and the local initiate port is allowed.

In step 808, the connection rules may be used to process traffic received over the MH connection. For example, MP 106 and/or CM 102 may allow MH related traffic directed to any IP address associated with MP 106 because the firewall rules match an IP tuple, e.g., including the local initiate port, associated with the MH related traffic.

In some embodiments, determining that an MH connection is enabled and identifying a related local initiate port may involve querying a data store containing information about connections associated with a network node.

In some embodiments, a network node may perform process 800. In such embodiments, a network node that performs process 800 may utilize a Linux kernel, one or more Linux modules, and/or other operating software. In some embodiments, a network node that performs process 800 may include a DSR, a DRA, or an MP.

In some embodiments, an MP (e.g., one of MPs 106-112) may comprise a distinct message processing module of a distributed computing platform, a computing blade in a blade-based distributed computing platform, a processing core element associated with a single or multi-core computing device, an application server, or a virtual node instantiated on a single physical computing device.

It will be appreciated that process 800 is for illustrative purposes and that different and/or additional actions may be used. It will also be appreciated that various actions described herein may occur in a different order or sequence.

It should be noted that DSR 100, CM 102, MPs 106-112, and/or functionality described herein may constitute a special purpose computing device. Further, DSR 100, CM 102, MPs 106-112, and/or functionality described herein can improve the technological field of network communications by providing mechanisms and/or techniques for supporting MH connections at a network node or related components. For example, by utilizing non-ephemeral ports for initiating an SCTP MH connection involving DSR 100 or MPs 106-112, CM 102 at DSR 100 can configure connection rules (e.g., firewall rules), thereby allowing DSR 100 or MPs 106-112 to receive traffic directed to IP addresses associated with the SCTP MH connection.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as group forth hereinafter.

What is claimed is:

1. A method for supporting multi-homed (MH) connections, the method comprising:

providing a data store for storing information indicating a non-ephemeral local initiate port number for initiating a stream control transmission protocol (SCTP) connection for at least one of a plurality of MH endpoints associated with a connection manager and information indicating whether SCTP MH initiator connections are enabled or disabled for each of the plurality of MH endpoints, wherein, when SCTP MH initiator connections are disabled for a first MH endpoint, a signaling firewall indicates a local service port as a source port in a connection rule associated with ingress traffic for the first MH endpoint;

determining, using the data store, that an SCTP MH connection between the first MH endpoint and a second MH endpoint and initiated by the first MH endpoint is enabled, wherein each of the MH endpoints is associated with a primary internet protocol (IP) address and at least one secondary IP address for reaching the respective MH endpoint;

identifying, using the data store, a local initiate port associated with the SCTP MH connection, wherein the local initiate port is a non-ephemeral port determined prior to the SCTP MH connection being initiated, wherein the local service port is different from the local initiate port used to initiate the SCTP MH connection;

using the local initiate port to configure connection rules to allow traffic associated with a plurality of paths associated with the SCTP MH connection, wherein the connection rules indicate that ingress traffic directed to one of the IP addresses for reaching the first MH endpoint and the local initiate port is allowed; and using, by the signaling firewall, the connection rules to process and allow traffic received over the SCTP MH connection, wherein the allowed traffic includes an SCTP heartbeat message sent from the second MH endpoint to the first MH endpoint, wherein the SCTP heartbeat message is addressed to one of the at least one secondary IP address of the first MH endpoint and the local initiate port.

2. The method of claim 1 wherein determining that the SCTP MH connection is enabled and identifying the local initiate port involves querying a data store containing information about connections associated with a network node.

3. The method of claim 1 wherein the connection manager is located at a network node.

4. The method of claim 3 wherein the network node utilizes a Linux kernel.

5. The method of claim 3 wherein the network node includes a Diameter signaling router, a Diameter routing agent, or a message processor.

6. The method of claim 5 wherein the message processor comprises:

a distinct message processing module of a distributed computing platform;

a computing blade in a blade-based distributed computing platform;

a processing core element associated with a single or multi-core computing device;

an application server; or a virtual node instantiated on a single physical computing device.

7. A system for supporting multi-homed (MH) connections, the system comprising:

a memory;

at least one physical processor; and a connection manager implemented using the memory and the at least one physical processor; wherein the connection manager is configured for:

providing a data store for storing information indicating a non-ephemeral local initiate port number for initiating a stream control transmission protocol (SCTP) connection for at least one of a plurality of MH endpoints associated with a connection manager and information indicating whether SCTP MH initiator connections are enabled or disabled for each of the plurality of MH endpoints, wherein, when SCTP MH initiator connections are disabled for a first MH endpoint, a signaling firewall indicates a local service port as a source port in a connection rule associated with ingress traffic for the first MH endpoint;

determining, using the data store, that an SCTP MH connection between the first MH endpoint and a second MH endpoint and initiated by the first MH endpoint is enabled, wherein each of the MH endpoints is associated with a primary internet protocol (IP) address and at least one secondary IP address for reaching the respective MH endpoint;

identifying, using the data store, a local initiate port associated with the SCTP MH connection, wherein the local initiate port is a non-ephemeral port determined prior to the SCTP MH connection being initiated, wherein the local service port is different from the local initiate port used to initiate the SCTP MH connection;

using the local initiate port to configure connection rules to allow traffic associated with a plurality of paths associated with the SCTP MH connection, wherein the connection rules indicate that ingress traffic directed to one of the IP addresses for reaching the first MH endpoint and the local initiate port is allowed; and using, by the signaling firewall, the connection rules to process and allow traffic received over the SCTP MH connection, wherein the allowed traffic includes an SCTP heartbeat message sent from the second MH endpoint to the first MH endpoint, wherein the SCTP heartbeat message is addressed to one of the at least one secondary IP address of the first MH endpoint and the local initiate port.

8. The system of claim 7 wherein the connection manager is configured for querying a data store containing information about connections associated with a network node to determine that the SCTP MH connection is enabled and to identify the local initiate port.

9. The system of claim 7 wherein the connection manager is located at a network node.

10. The system of claim 9 wherein the network node utilizes a Linux kernel.

11. The system of claim 9 wherein the network node includes a Diameter signaling router, a Diameter routing agent, or a message processor.

12. The system of claim 11 wherein the message processor comprises:

a distinct message processing module of a distributed computing platform;

a computing blade in a blade-based distributed computing platform;

a processing core element associated with a single or multi-core computing device;

an application server; or a virtual node instantiated on a single physical computing device.

13. A non-transitory computer readable medium comprising computer executable instructions that when executed by a processor of a computer cause the computer to perform steps comprising:

providing a data store for storing information indicating a non-ephemeral local initiate port number for initiating a stream control transmission protocol (SCTP) connection for at least one of a plurality of MH endpoints associated with a connection manager and information indicating whether SCTP MH initiator connections are enabled or disabled for each of the plurality of MH endpoints, wherein, when SCTP MH initiator connections are disabled for a first MH endpoint, a signaling firewall indicates a local service port as a source port in a connection rule associated with ingress traffic for the first MH endpoint;

determining, using the data store, that an SCTP MH connection between the first MH endpoint and a second MH endpoint and initiated by the first MH endpoint is enabled, wherein each of the MH endpoints is associated with a primary internet protocol (IP) address and at least one secondary IP address for reaching the respective MH endpoint;

identifying, using the data store, a local initiate port associated with the SCTP MH connection, wherein the local initiate port is a non-ephemeral port determined prior to the SCTP MH connection being initiated, wherein the local service port is different from the local initiate port used to initiate the SCTP MH connection;

using the local initiate port to configure connection rules to allow traffic associated with a plurality of paths associated with the SCTP MH connection, wherein the connection rules indicate that ingress traffic directed to one of the IP addresses for reaching the first MH endpoint and the local initiate port is allowed; and using, by the signaling firewall, the connection rules to process and allow traffic received over the SCTP MH connection, wherein the allowed traffic includes an SCTP heartbeat message sent from the second MH endpoint to the first MH endpoint, wherein the SCTP heartbeat message is addressed to one of the at least one secondary IP address of the first MH endpoint and the local initiate port.

* * * * *